US005709984A

United States Patent [19]

Chen et al.

[11] Patent Number: 5,709,984

[45] Date of Patent: Jan. 20, 1998

[54] COATING COMPOSITION FOR ELECTRICALLY-CONDUCTIVE LAYER COMPRISING VANADIUM OXIDE GEL

[75] Inventors: Janglin Chen, Rochester; Richard A. Castle, Webster; Karen E. Gleasman, Rochester, all of N.Y.

[73] Assignee: Eastman Kodak Company, Rochester, N.Y.

[21] Appl. No.: 740,572

[22] Filed: Oct. 31, 1996

[51] Int. Cl.$^6$ .............................. G03C 1/85; G03C 1/89; B32B 9/00; H01B 1/06

[52] U.S. Cl. .......................... 430/527; 430/530; 430/533; 430/935; 252/518; 428/480; 428/702

[58] Field of Search .................................... 428/702, 480; 252/518; 430/527, 530, 935

[56] References Cited

U.S. PATENT DOCUMENTS

| | | | |
|---|---|---|---|
| 2,627,088 | 2/1953 | Alles et al. | 430/171 |
| 3,501,301 | 3/1970 | Nadeau et al. | 96/87 |
| 4,203,769 | 5/1980 | Guestaux | 430/631 |
| 5,006,451 | 4/1991 | Anderson et al. | 430/527 |
| 5,203,884 | 4/1993 | Buchanan et al. | 51/295 |
| 5,322,761 | 6/1994 | Kausch et al. | 430/273 |
| 5,326,689 | 7/1994 | Murayama | 430/530 |
| 5,356,468 | 10/1994 | Havens et al. | 106/195 |
| 5,360,706 | 11/1994 | Anderson et al. | 430/529 |
| 5,360,707 | 11/1994 | Kato et al. | 430/538 |
| 5,366,544 | 11/1994 | Jones et al. | 106/187 |
| 5,372,985 | 12/1994 | Chang et al. | 503/201 |
| 5,407,603 | 4/1995 | Morrison | 252/518 |
| 5,424,269 | 6/1995 | Chang et al. | 503/227 |
| 5,427,835 | 6/1995 | Morrison et al. | 430/527 |
| 5,439,785 | 8/1995 | Boston et al. | 430/530 |
| 5,514,528 | 5/1996 | Chen et al. | 430/530 |

FOREIGN PATENT DOCUMENTS

| | | |
|---|---|---|
| 655646 | 5/1995 | European Pat. Off. . |
| 4125758 | 2/1993 | Germany . |
| 93/24584 | 12/1993 | WIPO . |
| 94/18012 | 8/1994 | WIPO . |
| 94/24218 | 10/1994 | WIPO . |
| 94/24607 | 10/1994 | WIPO . |

*Primary Examiner*—Richard L. Schilling
*Attorney, Agent, or Firm*—Andrew J. Anderson

[57] ABSTRACT

A coating composition useful for forming an electrically conductive layer on a substrate is disclosed, said composition comprising a liquid medium containing: a) a vanadium oxide gel, b) a film-forming binder, and c) a conductivity-increasing amount of a volatile aromatic compound comprising an aromatic ring substituted with at least one hydroxy group or a hydroxy substituted substituent group. Further embodiments of the invention disclose a composite support for an imaging element, which composite support comprises a polymeric film having coated thereon an electrically conductive layer, wherein the electrically conductive layer has been formed by applying a coating of the coating composition of the invention, and drying the coating. In accordance with yet a further embodiment of the invention, an imaging element for use in an image-forming process is described, which element comprises a support, an image-forming layer, and an electrically conductive layer, said electrically conductive layer having been formed by applying a coating of the coating composition of the invention, and drying the coating. The invention provides composite supports and imaging elements containing an electrically conductive antistatic layer having excellent antistatic performance and adhesion to polymer film supports.

20 Claims, No Drawings

COATING COMPOSITION FOR ELECTRICALLY-CONDUCTIVE LAYER COMPRISING VANADIUM OXIDE GEL

FIELD OF THE INVENTION

This invention relates in general to coating compositions for forming electrically-conductive layers for supports for imaging elements, such as photographic, electrostatophotographic and thermal imaging elements, and in particular to composite supports comprising a polymeric film and an electrically conductive antistatic layer, and imaging elements comprising such polymeric film, antistatic layer, and an image-forming layer. More particularly, this invention relates towards such composite supports and imaging elements wherein the conductivity of an electrically conductive layer is effectively increased, and wherein the electrically conductive layer may be directly coated on a film support without pretreatment with a chemical etchant and precoating of a separate adhesion improving subbing layer.

BACKGROUND OF THE INVENTION

Imaging elements are generally complicated systems comprising a support, adhesion or tie layers, image recording layers and auxiliary layers for improved performance such as electrically conductive layers, lubricant layers, abrasion resistant layers, curl-control layers, anti-halation layers, magnetic recording layers, etc. The multiple layers required to achieve the desired performance results in a complicated coating process with severe requirements for adhesion to the support and between layers.

Adhesion of auxiliary layers, such as electrically conductive layers, to polymer film supports has traditionally been achieved through the use of suitable surface pre-treatment and coating of adhesion or tie layers, in combination generally referred to as a subbing system. Subbing systems generally involve pre-treatment of a support polymer surface with a chemical etch or "bite" agent, and subsequent coating of a polymeric tie layer which has good adhesion to the chemically treated surface and to which a subsequently applied auxiliary layer will have good adhesion. Some useful compositions for this purpose include polymers containing vinylidene chloride such as vinylidene chloride/methyl acrylate/itaconic acid terpolymers or vinylidene chloride/acrylonitrile/acrylic acid and the like; butadiene-based copolymers, glycidyl acrylate, or methacrylate containing copolymers, or maleic anhydride containing copolymers. These and other suitable compositions are described, for example, in U.S. Pat. Nos. 2,627,088; 2,698,240; 2,943,937; 3,143,421; 3,201,249; 3,271,178; 3,443,950; 3,501,301 and 5,514,528. The polymeric subbing layer is in many instances overcoated with an additional subbing layer comprised of gelatin, typically referred to as a Gel sub, to aid in adhesion to subsequently aqueous coated layers. The first functional layer, which may frequently desirably be an electrically conductive or "antistatic" layer for control of electrostatic charge, is generally applied after such surface-treatment and application of such subbing layers.

This approach has several drawbacks, particularly with the requirement of at least two separate coatings for the subbing system before coating of any functional layer, which results in manufacturing waste for each coating operation. This is particularly a problem where multiple functional layers may need to be coated at the same time in addition to any subbing treatment, as coating production machines generally have a practical limit to the number of coatings which may be applied at one time.

Problems associated with electrostatic charge in the manufacture and utilization of imaging elements are well-known. The accumulation of charge can result in dirt or dust attraction, producing physical defects. The discharge of accumulated charge during application or use of radiation sensitive layers (for example, photographic emulsions) can produce irregular fog patterns or static marks in the light sensitive layer(s). These static charge problems have become increasingly more severe due to increased photographic emulsion sensitivity, increased coating machine speeds, and increased post-coating drying efficiency. Transport charging results from the tendency of high dielectric materials to accumulate electrical charge when in relative motion to other materials. This results in static charging during coating and post-coating operations such as slitting and spooling. Static charge build-up may also occur during use of imaging elements, for example during winding of a roll of photographic film out of and back into a film cassette in an automatic camera. Static discharge during magnetic reading and writing can result in increased bit error rates. These problems can be exacerbated at low relative humidities. Similarly, high speed processing of imaging elements can result in static charge generation.

Due to the increasing demands for static charge control, electrically conductive "antistatic" layers incorporating a wide variety of ionically-conducting and electronically-conducting materials have been incorporated into photographic imaging, magnetic recording and other imaging elements. The requirements for antistatic layers in silver halide photographic films are especially demanding because of the stringent optical requirements associated with such films. As such antistatic layers are frequently the first functional auxiliary layer coated on a polymeric film support, much prior work has been directed towards providing good adhesion between such layers and the polymer fill. Further, as additional auxiliary layers may be desirably coated over such antistatic layers, such as a magnetic recording layer, much work has also been directed towards providing good adhesion between the antistatic layer and the overcoated layers.

Electrically conductive antistatic layers comprising vanadium oxide gels dispersed in polymeric binders are well known as disclosed, e.g., in U.S. Pat. No. 4,203,769, and such antistatic materials provide effective antistatic protection at advantageously low coverages. Such compositions, however, also present particularly severe adhesion and coating solution stability requirements, as indicated by the prior art directed towards such problems. U.S. Pat. No. 5,360,707, e.g., teaches the use of antistatic formulations of $V_2O_5$ in a polyesterionomer binder having excellent stability and adhesion to underlying and overlying layers. U.S. Pat. No. 5,427,835 discloses the use of sulfopolymers for binders with vanadium oxide antistatic compositions. These patents disclose the use of binders which impart improved stability to vanadium oxide gels and could potentially be applied to surface-treated and/or subbed supports. World Pat. No. 94/24607 indicates that the sulfopolyester based antistatic layer containing vanadium oxide has good adhesion to untreated supports. U.S. Pat. No. 5,427,835 teaches that the sulfopolyester based antistatic layer has excellent dry adhesion to flame treated polyethylene terephthalate. U.S. Pat No. 5,439,785 describes the use of epoxy-silanes as adhesion promoters in conjunction with the sulfopolyester vanadium oxide layers for improved antistatic performance and adhesion. U.S. Pat. No. 5,514,528 discloses the use of adhesion promoting agents for initial pre-treatment of a support, and the subsequent coating of solvent cast subbing layers and antistatic layers comprising conductive metal oxides such as vanadium pentoxide.

An additional problem associated with the use of vanadium oxide gels as an antistat is its sensitivity toward combination with various other materials. Vanadium pentoxide, e.g., is a strong oxidizing agent which reacts with a number of organic functionalities. Accordingly, it has not been trivial to include vanadium pentoxide in a single layer with other common functional photographic components. Therefore, its utility has been somewhat limited by this inherent incompatibility. Much prior art has been directed towards providing stable vanadium pentoxide compositions. U.S. Pat. Nos. 5,356,468, 5,360,707, 5,366,544 and 5,427,835, e.g., disclose antistatic layer compositions directed towards improving the stability of $V_2O_5$.

Due to the exceptional adhesion requirements of electrically conductive layers containing vanadium oxide gels as conductive agents, such layers generally exhibit poor adhesion when directly coated on an untreated or subbed support, especially when subsequently overcoated with an auxiliary layer such as a transparent magnetic recording layer. Such adhesion problems are particularly present for such antistatic layers at polymeric binder/vanadium oxide ratios of less than about 12/1, and especially less than 4/1, and most particularly such antistatic layers overcoated with a cellulosic-based transparent magnetic recording layer. Accordingly, it may be required to coat such compositions at relatively high binder to vanadium oxide ratios. High binder to vanadium oxide gel ratios, however, typically result in significantly higher resistivity for a given layer coverage, and thus require higher layer coverages to obtain adequate conductivity for effective antistatic protection. It would be desirable to be able to obtain desired levels of conductivity at lower layer coverages of vanadium oxide gels than previously required in the art.

The increasing need of additional layers for improved performance has resulted in numerous coating passes, greater complexity and more demanding adhesion requirements for imaging elements. It would be desirable to reduce the number of coating passes required when coating a electrically conductive layer on a support, thereby reducing coating complexity and coating solvent emissions, while maintaining good layer adhesion and the improved performance provided for imaging elements by such additional layers.

SUMMARY OF THE INVENTION

It would be desirable to provide coating compositions for electrically conductive layers comprising vanadium oxide gels wherein the electrical conductivity of the vanadium oxide gel is increased. It would be further desirable to provide such coating compositions which adhere well directly to polyester films. It would be further desirable to provide composite supports and imaging elements comprising electrically conductive layers formed from such coating compositions.

The present invention meets these and other objectives by providing a coating composition useful for forming an electrically conductive layer on a substrate, said composition comprising a liquid medium containing: a) a vanadium oxide gel, b) a fill-forming binder, and c) a conductivity-increasing amount of a volatile aromatic compound comprising an aromatic ring substituted with at least one hydroxy group or a hydroxy substituted substituent group.

In accordance with a further embodiment of the invention a composite support for an imaging element is described, which composite support comprises a polymeric film having coated thereon an electrically conductive layer, wherein the electrically conductive layer has been formed by applying a coating of the coating composition of the invention, and drying the coating. In accordance with yet a further embodiment of the invention, an imaging element for use in an image-forming process is described, which element comprises a support, an image-forming layer, and an electrically conductive layer, said electrically conductive layer having been formed by applying a coating of the coating composition of the invention, and drying the coating.

The invention provides composite supports and imaging elements containing an electrically conductive antistatic layer having excellent antistatic performance and adhesion to polymer film supports.

DETAILED DESCRIPTION OF THE INVENTION

The coating compositions and composite supports of this invention can be used for many different types of imaging elements. While the invention is applicable to a variety of imaging elements such as, for example, photographic, electrostatophotographic, photothermographic, migration, electrothermographic, dielectric recording and thermal-dye-transfer imaging elements, the invention is primarily applicable to photographic elements, particularly silver halide photographic elements. Accordingly, for the purpose of describing this invention and for simplicity of expression, photographic elements will be primarily referred to throughout this specification; however, it is to be understood that the invention also applies to other forms of imaging elements.

The coating compositions in accordance with the invention comprise a liquid medium containing a vanadium oxide gel, a film-forming binder, and a conductivity-increasing amount of a volatile aromatic compound comprising an aromatic ring substituted with at least one hydroxy group or a hydroxy substituted substituent group. Preferably, the volatile aromatic compound comprises an aromatic ring which is directly substituted with at least one hydroxyl group. Aromatic compounds of this type have been previously used as chemical etchants for pre-treating polymeric film supports. Applicants have surprisingly discovered that stable, functional coating compositions may be maintained where such aromatic compounds are added to a vanadium oxide gel antistatic layers coating composition. Further, such aromatic compounds surprisingly have been found to promote the conductivity of vanadium oxide gel-based antistatic layers, as well as improve the adhesion of the coated layer to polymer film supports. For purposes of this invention, "volatile" is meant to describe compounds which are removed by at least 95%, more preferably at least 99%, upon coating of a thin layer of the coating composition and drying at 90° C. for 5 minutes.

Exemplary volatile aromatic compounds which may be used in accordance with the invention include aromatic compounds of the following formula:

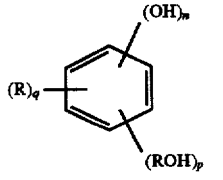

where R represents a non-hydroxylated substituent, ROH represents a hydroxylated substituent, n=0–6, p=0–6, q=0–5, and n+p=at least 1. Each R may independently represent, e.g., any photographically acceptable substituent, such as, e.g., halogen (e.g., chloro, fluoro, iodo), cyano, nitro, alkoxy (e.g., methoxy, ethoxy), alkyl (e.g., methyl, ethyl, propyl), etc. Two or more R groups may also be joined to form condensed rings, which may be aromatic or non-aromatic. —ROH preferably represents a substituent of the formula $-(CH_2)_mOH$, where m equals 0, 1, 2, or 3. Preferably, the aromatic compound comprises a phenyl group which is directly substituted with at least one hydroxy group. Such preferred aromatic compounds may be additionally further substituted with other substituents such as described above.

Representative aromatic compounds for use in accordance with the invention include the following:

Phenol
4-Chloro-3-methyl phenol
4-Chlorophenol
2-Cyanophenol
2,6-Dichlorophenol
2-Ethylphenol
Resorcinol
Benzyl alcohol
3-phenyl-1-propanol
4-Methoxyphenol
1,2-Catechol
2,4-Dihydroxytohene
4-Chloro-2-methyl phenol
2,4-Dinitrophenol
4-Chlororesominol
1-Naphthol
1,3-Naphthalenediol While relatively minor amounts (e.g., less than 0.1 wt %) of the volatile aromatic compounds may be effective at increasing the conductivity of the vanadium oxide gel in the coating compositions of the invention, the volatile aromatic compound preferably comprises at least 0.1 wt % of the coating composition, more preferably at least 0.2 wt % and most preferably at least about 0.4 wt % in order to provide good adhesion for the coated layer when coated directly on a previously untreated, unsubbed polymer film support, as well as provide an effective conductivity enhancement to the vanadium oxide gel. Concentrations of volatile aromatic compound in the coating compositions are also preferably maintained below about 10 wt %, more preferably below about 2 wt %, however, in order to limit the amount of volatilized compound which must be recovered while minimizing the presence of residual material after coating and drying of the composition.

The vanadium oxide gel used in accordance with the invention may be described as a conductive "amorphous" gel comprised of vanadium oxide ribbons or fibers. Such vanadium oxide gels may be prepared by any variety of methods, including but not specifically limited to melt quenching as described in U.S. Pat. No. 4,203,769, ion exchange as described in DE 4,125,758, or hydrolysis of a vanadium oxoalkoxide as claimed in WO 93/24584. The vanadium oxide gel is preferably doped with silver to enhance conductivity. Other methods of preparing vanadium oxide gels which are well known in the literature include reaction of vanadium or vanadium pentoxide with hydrogen peroxide and hydrolysis of $VO_2OAc$ or vanadium oxychloride. Preferred vanadium oxide gels comprise vanadium pentoxide gels, such as obtained by melt quenching as described in U.S. Pat. No. 4,203,769.

The polymeric binder of the electrically conductive layer may comprise any organic solvent-soluble polymeric material which forms film upon coating and drying. Such binders include, e.g., acrylic resins (including methacrylates, methacrylic acids, acrylamides and methacrylamides) such as polymethyl methacrylate, polymethyl acrylate, polyethyl methacrylate, poly(styrene-co-methyl mehtacrylate); ethylene-methylacrylate copolymers, ethylene-ethylacrylate copolymers, ethylene-ethyl methacrylate copolymers; polyvinyl resins such as polyvinyl chloride, copolymers of vinyl chloride and vinyl acetate; vinylidene chloride based polymers including terpolymers of vinylidene chloride/methyl acrylate/itaconic acid and vinylidene chloride/acrylonitrile/acrylic acid; cellulose derivatives including cellulose nitrate, cellulose acetate, cellulose diacetate, cellulose triacetate, cellulose acetate butyrate, and cellulose acetate propionate; polyesters, polyurethanes, polyamides, mixtures and blends thereof and the like.

Preferred binders include addition copolymers of monomers such as vinyl chloride, vinylidene chloride, acrylonitrile, methacrylonitrile, alkyl acrylates where the alkyl group contains from one to six carbon atoms, acrylic acid, itaconic acid, monomethyl itaconic acid, maleic acid, and the like. The most preferred polymers for use as a binder in accordance with the invention are terpolymers of vinylidene chloride, acrylonitrile, and acrylic acid.

Generally, increased loading of conductive materials results in reduced adhesion, although in certain instances adhesion may be enhanced by the presence of the conductive material. Therefore, the desired ratio of conductive material to binder and the total coverage of the electrically conductive antistatic layer depend on the required conductivity for charge control and the nature of the conductive material. For a conductive vanadium oxide gel it is preferred that the ratio of binder/vanadium oxide gel be in the weight ratio of 1/2 to 300/1 and more preferably from approximately 1/1 up to 200/1. The required coverage of the electrically conductive antistatic layer depends on an appropriate thickness to achieve the desired resistivity level which is determined in a large part on the polymeric binder to antistatic ratio. Preferred overall layer dry coverages range from approximately 0.005 to 1.50 $g/m^2$ with the higher coverages generally preferred at higher binder/vanadium oxide ratios. Use of vanadium oxide having increased conductivity in accordance with the invention requires less amounts of such conductive material for acceptable performance, however, allowing higher binder/conductive agent ratios to be used in the electrically conductive layer coating solution, without increasing overall coating weights, providing effective adhesion to the support and overcoated auxiliary layers. Electrically conductive layers comprising vanadium oxide gel dry coverages of from about 0.5 to 50 $mg/m^2$, more preferably about 1 to 10 $mg/m^2$, and binder dry coverages of about 20 to 500 $mg/m^2$, more preferably about 50 to 250 $mg/m^2$, are generally sufficient.

The electrically conductive layers of this invention may be coated from any conventional liquid coating medium. The coating compositions preferably comprise an organic solvent or solvent mixture, such as a polar organic medium or a substantially non-polar aromatic hydrocarbon or halogenated hydrocarbon, or a solvent or water/solvent blend. Examples of useful organic solvents include ethers, organic acids, esters, ketones, glycols, alcohols and amides. Preferred polar organic liquids are dialkyl ketones, alkyl esters of alkane carboxylic acids and alcohols, especially such liquids containing up to, and including, a total of 6 carbon atoms. Examples of such liquids are dialkyl and cycloalkyl ketones such as acetone, methyl-ethylketone, di-ethylketone, di-iso-propylketone, methyl-iso-butylketone, di-iso-butylketone, methyl-iso-amylketone, methyl-n-amylketone and cyclohexanone; alkyl esters such as methyl acetate, ethyl acetate, propyl acetate, isopropyl acetate, butyl acetate, methyl acetoacetate, ethyl formate, methyl propionate and ethyl butyrate, glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alcohols such as methanol, ethanol, n-propanol, isopropanol, n-butanol and isobutanol and dialkyl and cyclic ethers such as diethylether and tetrahyrofuran.

Preferred organic solvents for use in accordance with the invention include those commonly used in manufacture of photographic elements, such as ethyl acetate, propyl acetate, methanol, ethanol, butanol, n-propanol, methyl acetoacetate, and acetone. Mixtures of ethanol (or other alcohols) and acetone are particularly useful.

Useful coating solvents and binder combinations for vanadium pentoxide antistatic layer compositions are disclosed in U.S. Pat. Nos. 5,356,468 and 5,366,544, the disclosures of which are incorporated herein by reference.

Coating compositions in accordance with the invention result in layers providing increased conductivity relative to prior art coatings containing comparable levels of vanadium oxide. Such compositions may be applied directly to an untreated support, or may be used with supports which have been subjected to surface treatments and/or subbed with coatings applied to either side thereof designed to improve adhesion. Useful film supports can be surface-treated, e.g., by various conventional energetic processes including, but not limited to corona-discharge treatment, glow-discharge or plasma treatment, ultraviolet radiation, time treatment and electron beam treatment. In a preferred embodiment of the invention, however, the coating compositions are advantageously coated directly on untreated and unsubbed film supports, as such coating compositions provide good adhesion directly thereto.

Any suitable film support may be employed in the practice of this invention, such as, cellulose derivatives including cellulose diacetate, cellulose triacetate, cellulose propionate, cellulose butyrate, cellulose acetopropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate and blends or laminates thereof; polystyrene, polypropylene, polyethylene, polymethylpentene, polysulfone, polyethersulfone, polyarylates, polyether imides and the like. Particularly preferred supports are polyethylene terephthalate, polyethylene naphthalate and the cellulose esters particularly cellulose triacetate. The supports can either be colorless or colored by the addition of a dye or pigment. Depending on the nature of the support, suitable transparent tie or undercoat layers may be desired. Particularly with regard to polyester supports, primers may used in order to promote adhesion of coated layers. Any suitable primers in accordance with those described in the following U.S. Pat. Nos. e.g., may be employed: 2,627,088; 3,501,301; 4,689,359; 4,363,872; 4,098,952 and 5,514,528. As described above, however, it is an advantage of the invention that the coating compositions provide good adhesion directly to untreated, unsubbed polyester supports.

Photographic elements which can be provided with an electrically conductive antistatic layer in accordance with the invention can differ widely in structure and composition. For example, they can vary greatly in the type of support, the number and composition of image-forming layers, and the kinds of auxiliary layers that are included in the elements. In particular, the photographic elements can be still films, motion picture films, x-ray films, graphic arts films, prints, or microfiche. They can be black-and-white elements or color elements. They may be adapted for use in a negative-positive process or for use in a reversal process.

In addition to the vanadium oxide gel, binder, and the conductivity increasing aromatic compound, the electrically conductive layer coating composition may include addenda such as dispersants, surface active agents, plasticizers, solvents, co-binders, matte particles, magnetic particles, filler particles, soluble dyes, solid particle dyes, haze reducing agents, adhesion promoting agents, hardeners, etc.

The antistatic layer coating formulation may be prepared as a single dispersion comprising vanadium oxide gel, binder, aromatic compound, and optional coating aids or other addenda or alternatively may be prepared as multiple dispersions which are brought together and mixed immediately prior to coating in a technique known as mixed melt formation. This latter process reduces the potential need of surface active agents for improved dispersion stability (dispersants) and avoids potential solution instability and/or incompatibility problems between the binder and conductive agent or addenda.

The electrically conductive antistatic layer of the present invention may optionally be overcoated with a wide variety of additional functional or auxiliary layers. As an example of auxiliary layers which may be desirably coated over an antistatic layer, it is well known from various U.S. Pat. Nos. including U.S. Pat. Nos. 3,782,947; 4,279,945; 4,990,276; 5,217,804; 5,147,768; 5,229,259; 5,255,031; and others that a radiation-sensitive silver halide photographic element may contain a transparent magnetic recording layer which can advantageously be employed to record information into and read information from the magnetic recording layer by techniques similar to those employed in the conventional magnetic recording art. The use of a magnetic recording layer for information exchange allows improved photographic print quality through input and output of information identifying the light-sensitive material, photographic conditions, printing conditions and other information. Additional auxiliary layers which may also be desirably present in imaging elements in accordance with the invention include abrasion resistant and other protective layers, abrasive-containing layers, adhesion promoting layers, layers to control water or solvent permeability, cud control layers, transport control layers, lubricant layers and other layers for purposes such as improved web conveyance, optical properties, physical performance and durability. In a preferred embodiment of the invention, the electrically conductive layer is overcoated with at least a transparent magnetic recording layer and an optional lubricant layer. A permeability control layer may also be coated between the antistatic layer and transparent magnetic recording layer. Magnetic layers suitable for use in the composite supports and imaging elements in accordance with the invention include those as described, e.g., in *Research Disclosure*, November 1992, Item 34390. *Research Disclosure* is published by Kenneth Mason Publications, Ltd., Dudley House, 12 North Street, Erosworth, Hampshire P010 7DQ, ENGLAND.

Suitable polymeric binders for auxiliary layers (including transparent magnetic recording layers) which may be coated over the electrically conductive antistatic layer include:

gelatin; cellulose compounds such as cellulose nitrate, cellulose acetate, cellulose diacetate, cellulose triacetate, carboxymethyl cellulose, hydroxyethyl cellulose, cellulose acetate butyrate, cellulose acetate propionate, cellulose acetate phthalate and the like; vinyl chloride or vinylidene chloride-based copolymers such as, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic ester-vinylidene chloride copolymers, methacrylic ester-vinylidene chloride copolymers, vinylidene chloride-acrylonitrile copolymers, acrylic ester-acrylonitrile copolymers, methacrylic ester-styrene copolymers, thermoplastic polyurethane resins, thermosetting polyurethane resins, phenoxy resins, phenolic resins, epoxy resins, polycarbonate or polyester resins, urea resins, melamine resins, alkyl resins, urea-formaldehyde resins, and the like; polyvinyl fluoride, butadiene-acrylonitrile copolymers, acrylonitrile-butadiene-acrylic acid copolymers, acrylonitrile-butadiene-methacrylic acid copolymers, polyvinyl alcohol, polyvinyl butyral, polyvinyl acetal, styrene-butadiene copolymers, acrylic acid copolymers, polyacrylamide, their derivatives and partially hydrolyzed products; and other synthetic resins. Other suitable binders include aqueous emulsions of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes or polyesterionomers. Preferred binders are polyurethanes, vinyl chloride based copolymers, acrylics or acrylamides and cellulose esters, particularly cellulose diacetate and cellulose triacetate.

Permeability control layers are useful for protecting those antistatic agents for which conductivity may degrade upon exposure to photographic processing solutions such as vanadium oxide gels. The additional auxiliary layers may be present in the imaging element either above or below the image recording layer or on the side of the support opposite the recording layer. Preferred permeability control layers comprise relatively hydrophobic polymers selected from the above list of binders, including cellulose esters such as cellulose diacetate and cellulose triacetate, polyesters, and poly(alkyl (meth)acrylates).

Transparent magnetic recording layers used in composite supports and imaging elements in accordance with preferred embodiments of the invention are comprised of magnetic particles dispersed in a film-forming binder. The layer may contain optional additional components for improved manufacturing or performance such as crosslinking agents or hardeners, catalysts, coating aids, dispersants, suffactants, including fluorinated suffactants, charge control agents, lubricants, abrasive particles, filler particles and the like. The magnetic particles of the present invention can comprise ferromagnetic or ferrimagnetic oxides, complex oxides including other metals, metallic alloy particles with protective coatings, ferrites, hexaferrites, etc. and can exhibit a variety of particulate shapes, sizes, and aspect ratios. Ferromagnetic oxides useful for transparent magnetic coatings include $\gamma$-$Fe_2O_3$, $Fe_3O_4$, and $CrO_2$. The magnetic particles optionally can be in solid solution with other metals and/or contain a variety of dopants and can be overcoated with a shell of particulate or polymeric materials. Preferred additional metals as dopants, solid solution components or overcoats are Co and Zn for iron oxides; and Li, Na, Sn, Pb, Fe, Co, Ni, and Zn for chromium dioxide. Surface-treatments of the magnetic particle can be used to aid in chemical stability or to improve dispersability as is commonly practiced in conventional magnetic recording. Additionally, magnetic oxide particles may contain a thicker layer of a lower refractive index oxide or other material having a low optical scattering cross-section as taught in U.S. Pat. Nos. 5,217,804 and 5,252,441. Cobalt surface-treated $\gamma$-iron oxide is the preferred magnetic particle.

The image-forming layer for imaging elements comprising an electrically conductive layer in accordance with the invention may be present on the same side of the support as the electrically conductive layer or on the opposite side. In preferred embodiments of the invention, the imaging element comprises a photographic element, and the image forming layer comprises a silver halide emulsion layer on the opposite side of the support relative to the electrically conductive layer.

Photographic elements in accordance with the preferred embodiment of the invention can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, antihalation layers, overcoat layers, subbing layers, and the like.

Photographic elements in accordance with one embodiment of the invention are preferably used in conjunction with an applied magnetic layer as described in *Research Disclosure*, November 1992, Item 34390. It is also specifically contemplated to use composite supports according to the invention in combination with technology useful in small format film as described in *Research Disclosure*, June 1994, Item 36230. *Research Disclosure* is published by Kenneth Mason Publications, Ltd., Dudley House, 12 North Street, Erosworth, Hampshire P010 7DQ, ENGLAND.

In the following discussion of suitable materials for use in the photographic emulsions and elements that can be used in conjunction with the composite supports of the invention, reference will be made to *Research Disclosure*, September 1994, Item 36544, available as described above, which will be identified hereafter by the term "*Research Disclosure*." The Sections hereafter referred to are Sections of the *Research Disclosure*, Item 36544.

The silver halide emulsions employed in the image-forming layers of photographic elements can be either negative-working or positive-working. Suitable emulsions and their preparation as well as methods of chemical and spectral sensitization are described in Sections I, and III–IV. Vehicles and vehicle related addenda are described in Section II. Dye image formers and modifiers are described in Section X. Various additives such as UV dyes, brighteners, luminescent dyes, antifoggants, stabilizers, light absorbing and scattering materials, coating aids, plasticizers, lubricants, antistats and matting agents are described, for example, in Sections VI–IX. Layers and layer arrangements, color negative and color positive features, scan facilitating features, supports, exposure and processing can be found in Sections XI–XX.

In addition to silver halide emulsion image-forming layers, the image-forming layer of imaging elements in accordance with the invention may comprise, e.g., any of the other image forming layers described in Christian et al. U.S. Pat. No. 5,457,013, the disclosure of which is incorporated by reference herein.

The following examples demonstrate the superior performance and robustness of the present invention.

EXAMPLE 1a

To one surface of polyethylene naphthalate (PEN) film support having a thickness of 90 micrometers, the following steps are conducted sequentially:

(i) Application of the electrically conductive layer

The following formulation was coated onto an untreated surface of the support, at the amount of 12 ml/$m^2$, and dried at 90° C. for 5 minutes.

| | |
|---|---|
| 0.57% of aqueous dispersion of a silver-doped vanadium pentoxide ($V_2O_5$ gel) | 87.75 g |
| Acrylonitrile-vinylidene chloride-acrylic acid copolymer, polymerization ratio by weight: 15/78/7 (binder) | 2 g |
| Acetone | 729 g |
| Ethanol | 181.25 g |

The vanadium silver doped vanadium pentoxide gel was prepared by the melt-quenching technique as taught by Guestaux in U.S. Pat. No. 4,203,769. The formulation is estimated to provide, in the dried coating, a dry coverage of 5 mg/$m^2$ of $V_2O_5$, and 20 mg/$m^2$ of the binder.

(ii) Application of Magnetic Layer

The following formulation was applied to the antistatic electrically conductive layer at the amount of 44.1 ml/$m^2$, and dried at 70° C. for 2 minutes.

| | |
|---|---|
| Cellulose diacetate | 25.10 g |
| Cellulose triacetate | 1.15 g |
| Magnetic oxide Toda CSF-4085V2 | 1.13 g |
| Surfactant Rhodafac PE 510 | 0.06 g |
| Alumina Norton E-600 | 0.76 g |
| Dispersing aid, Zeneca Solsperse 2400 | 0.04 g |
| Dichloromethane | 679.19 g |
| Acetone | 242.57 g |
| Methyl acetoacetate | 48.51 g |

Total dry coverage for the magnetic layer was nominally about 1.5 g/$m^2$.

Total dry coverage for the magnetic layer was nominally about 1.5 g/$m^2$.

(iii) Application of Lubricant Layer

An overcoat of carnauba wax at a dry coverage of 20 mg/$m^2$ was applied.

Dry adhesion of the coated samples was evaluated by first scribing the coating surface with a razor blade in a cross-hatch pattern, with repetitive 3 mm line spacing over an area of 3×3 $cm^2$. A piece of 7.5 cm long, 2.5 cm wide M Scotch™ 610 transparent tape was then tightly pressed onto the scribed area. The tape was then quickly pulled off, and the adhesion was graded according to the percentage of coating removed from the tested area:

A=no stripping

B=less than 5% of area was removed

C=6 to 20% of area was removed

D=greater than 20% of area removed

E=catastrophic failure, greater than 90% of area removed

Antistatic performance was evaluated by measuring the internal resistivities of the overcoated electrically conductive antistatic layers by the salt bridge method (see, for example, "Resistivity Measurements on Buried Conductive Layer" by R. A. Elder, pages 251–254, 1990 EOS/ESD Symposium Proceedings). This measurement is referred to as a wet electrode resistivity (WER) measurement. Results are reported as ohm/sq with lower numbers indicating less resistivity and better antistatic performance. For many applications a WER value of $10^{10}$ ohm/sq or less is desired.

EXAMPLE 1b to 1i

Example 1a is repeated except that a volatile aromatic compound in accordance with the invention, as described in Table 1, is added at 0.4 weight % to the electrically conductive layer coating composition.

TABLE 1

| | | Electrical resistivity, Ohm/sq | Dry adhesion | Comment |
|---|---|---|---|---|
| Ex. 1a | No Aromatic Compound | $6.3 \times 10^8$ | D | Comparative example |
| Ex. 1b | 4-Chloro-3-methyl phenol | $6.3 \times 10^6$ | A | Invention |
| Ex. 1c | p-Chlorophenol | $7.9 \times 10^6$ | A | Invention |
| Ex. 1d | 2-Cyanophenol | $2.5 \times 10^7$ | B | Invention |
| Ex. 1e | 2,6-Dichlorophenol | $1.0 \times 10^7$ | A | Invention |
| Ex. 1f | 2-Ethylphenol | $7.9 \times 10^6$ | A | Invention |
| Ex. 1g | Resorcinol | $1.0 \times 10^7$ | A | Invention |
| Ex. 1h | Benzyl alcohol | $2.5 \times 10^7$ | A | Invention |
| Ex. 1i | 3-phenyl-1-propanol | $2.5 \times 10^7$ | A | Invention |

It is clear from the results that addition of the aromatic compound to the coating solution in accordance with the invention not only improves the dry adhesion to the polyester film base but, most surprisingly, it also further lowers the electrical resistivity of the $V_2O_5$-containing coating.

EXAMPLE 2a to 2j

Example 1b is repeated except that the weight ratio of the dry $V_2O_5$, the binder, and 4-chloro-3-methyl phenol (x/y/z) in the sub coating solution was varied as indicated in Table 2. The x and y values also represent the dry coated weights for the $V_2O_5$ and binder in mg/$m^2$.

TABLE 2

| | x/y/z | Electrical resistivity, Ohm/sq | Dry adhesion | Comment |
|---|---|---|---|---|
| Ex. 2a | 5/10/0 | $1.3 \times 10^8$ | E | Comparative example |
| Ex. 2b | 5/10/20 | $1.3 \times 10^7$ | C | Invention |
| Ex. 2c | 5/10/40 | $1.0 \times 10^7$ | A | Invention |
| Ex. 2c | 5/20/0 | $6.3 \times 10^8$ | E | Comparative example |
| Ex. 2d | 5/20/20 | $2.5 \times 10^7$ | B | Invention |
| Ex. 2e | 5/20/40 | $1.6 \times 10^7$ | A | Invention |

TABLE 2-continued

| | x/y/z | Electrical resistivity, Ohm/sq | Dry adhesion | Comment |
|---|---|---|---|---|
| Ex. 2f | 5/40/0 | $2.5 \times 10^9$ | B | Comparative example |
| Ex. 2g | 5/40/20 | $5.0 \times 10^7$ | B | Invention |
| Ex. 2h | 5/40/40 | $3.2 \times 10^7$ | B | Invention |
| Ex. 2i | 0/40/0 | $>3.2 \times 10^{12}$ | A | Comparative example |
| Ex. 2j | 0/40/40 | $>3.2 \times 10^{12}$ | A | Comparative example |

The results here continue to indicate that the aromatic compound improves the dry adhesion, as well as the electrical property of the coatings. While the aromatic compound is capable of significantly lowering the electrical resistivity of $V_2O_5$ formulated coatings in accordance with the invention, the aromatic compound by itself is not electrically conductive as shown in Example 2j.

EXAMPLE 3a to 3I

Example 1b is repeated except that the film base is now a 100 micrometer thick poly(ethylene terephthalate), pretreated with an adhesion-promoting undercoat, and that the type of binder polymer and the weight ratio of $V_2O_5$/binder/the aromatic compound (x/y/z) in the electrically conductive layer coating solution are changed as indicated in Table 3. The x and y values again also represent the dry coated weights for the $V_2O_5$ and binder in $mg/m^2$.

TABLE 3

| | x/y/z | Electrical resistivity, Ohm/sq | Dry adhesion | Comment |
|---|---|---|---|---|
| | Binder = NVc* | | | |
| Ex. 3a | 5/20/0 | $6.3 \times 10^9$ | A | Comparative example |
| Ex. 3b | 5/20/40 | $7.9 \times 10^8$ | A | Invention |
| Ex. 3c | 5/20/80 | $3.2 \times 10^8$ | A | Invention |
| | Binder = Evacite 2010** | | | |
| Ex. 3d | 5/20/0 | $4.0 \times 10^{11}$ | A | Comparative example |
| Ex. 3e | 5/20/80 | $4.0 \times 10^{10}$ | A | Invention |
| | Binder = Cellulose Nitrate | | | |
| Ex. 3f | 5/20/0 | $6.3 \times 10^9$ | A | Comparative example |
| Ex. 3g | 5/20/40 | $2.0 \times 10^9$ | A | Invention |
| | Binder = CA398-30*** | | | |
| Ex. 3h | 5/20/0 | $4.0 \times 10^{11}$ | A | Comparative example |
| Ex. 3i | 5/20/40 | $5.0 \times 10^{10}$ | A | Invention |

*Copolymer of acryloylnitrile and vinylidene chloride (20/80) from Aldrich Chemical Co.
**Elvacite 2010 is a polymethylmethacrylate from DuPont Co.
***CA398-30 is a cellulose diacetate polymer from Eastman Chemical Co.

The results here show that electrical property improvement brought by the aromatic compound is also observed in a variety of polymer binders for the coating, and is not limited to the type of polyester film base.

EXAMPLE 4a to 4j

Example 1b is repeated except that the weight ratio of $V_2O_5$, the binder, and 4-chloro-3-methyl phenol (x/y/z) in the electrically conductive layer coating solution is changed as indicated in Table 4. The x and y values again also represent the dry coated weights for the $V_2O_5$ and binder in $mg/m^2$.

TABLE 4

| | x/y/z | Electrical resistivity, Ohm/sq | Dry adhesion | Comment |
|---|---|---|---|---|
| Ex. 4a | 5/20/0 | $6.3 \times 10^8$ | E | Comparative example |
| Ex. 4b | 5/20/10 | $4.0 \times 10^7$ | C | Invention |
| Ex. 4c | 5/20/20 | $2.5 \times 10^7$ | B | Invention |
| Ex. 4d | 5/20/40 | $1.6 \times 10^7$ | A | Invention |
| Ex. 4e | 4/20/40 | $1.6 \times 10^7$ | B | Invention |
| Ex. 4f | 3.5/20/40 | $2.0 \times 10^7$ | B | Invention |
| Ex. 4g | 3/20/40 | $3.2 \times 10^7$ | B | Invention |
| Ex. 4h | 2.5/20/40 | $4.0 \times 10^7$ | B | Invention |
| Ex. 4i | 2/20/40 | $1.0 \times 10^8$ | A | Invention |
| Ex. 4j | 1/20/40 | $6.3 \times 10^8$ | B | Invention |

The results indicate that, by incorporating the aromatic compound in the coating solution, one can employ significantly less amount of $V_2O_5$ used in the formulation, yet still obtain superior adhesion and satisfactory electrical properties.

Color photographic film elements were prepared by applying silver halide emulsion layers and auxiliary layers substantially as described in Examples 5–8 of U.S. Pat. No. 5,514,528, the disclosure of which is incorporated by reference herein, to the opposite side of supports coated with electrically conductive layers and magnetic recording layers as described in the above examples in accordance with the invention. Such photographic elements were found to retain the advantages demonstrated for the coated supports in Examples 1–4 above.

The preceding examples are set forth to illustrate specific embodiments of this invention and are not intended to limit the scope of the materials or combinations of this invention. Additional embodiments and advantages within the scope of the claimed invention will be apparent to one skilled in the art.

We claim:

1. A coating composition useful for forming an electrically conductive layer on a substrate, said composition comprising a liquid medium containing:

a) a vanadium oxide gel, b) a film-forming binder, and c) a conductivity-increasing amount of a volatile aromatic compound comprising an aromatic ring substituted with at least one hydroxy group or a hydroxy substituted substituent group.

2. A composition according to claim 1, wherein the aromatic compound comprises a phenyl group substituted with at least one substituent group of the formula $-(CH_2)_mOH$ where m equals 0, 1, 2, or 3.

3. A composition according to claim 1, wherein the aromatic compound comprises a phenyl group which is directly substituted with at least one hydroxy group.

4. A composition according to claim 1, wherein the aromatic compound is represented by the formula:

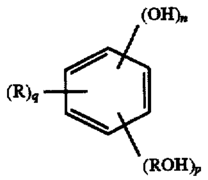

where R represents a non-hydroxylated substituent, ROH represents a hydroxylated substituent, n=0–6, p=0–6, q=0–5, and n+p=at least 1.

5. A composition according to claim 1, wherein the liquid medium comprises an organic solvent or solvent mixture.

6. A composition according to claim 1, wherein the binder comprises an acrylic resin polymer or copolymer, a polyvinyl resin polymer or copolymer, a vinylidene chloride based polymer or copolymer, a cellulose derivative, a polyester, a polyurethane, a polyamide, or a mixture or blend thereof.

7. A composition according to claim 1, wherein the binder comprises a terpolymer of vinylidene chloride, acrylonitrile, and acrylic acid.

8. A composition according to claim 1 wherein the vanadium oxide gel comprises silver doped vanadium pentoxide.

9. A composition according to claim 1 wherein the vanadium oxide gel comprises vanadium pentoxide prepared by melt-quenching.

10. A composite support for an imaging element, comprising a polymeric film having coated thereon an electrically conductive layer, said electrically conductive layer having been formed by applying a coating composition of a liquid medium containing:

a) a vanadium oxide gel, b) a film-forming binder, and c) a conductivity-increasing amount of a volatile aromatic compound comprising an aromatic ring substituted with at least one hydroxy group or a hydroxy substituted substituent group, and drying the coating.

11. A composite support according to claim 10, wherein at least one surface of the polymeric film has not been surface treated or subbed prior to coating the electrically conductive layer, and the electrically conductive layer is in contiguous contact with the untreated surface of the polymeric film.

12. A composite support according to claim 11, wherein the polymeric film comprises a polyester film.

13. A composite support according to claim 10, wherein the electrically conductive layer polymeric binder and vanadium oxide gel are present in the electrically conductive layer at a weight ratio in the range of from about 1:2 to 200:1.

14. A composite support according to claim 10 wherein the vanadium oxide gel comprises silver doped vanadium pentoxide.

15. A composite support according to claim 10 wherein the vanadium oxide gel comprises vanadium pentoxide prepared by melt-quenching.

16. A composite support according to claim 10, further comprising an auxiliary layer coated over the electrically conductive layer.

17. A composite support according to claim 16 in which the auxiliary layer is a transparent magnetic recording layer.

18. An imaging element for use in an image-forming process, comprising a support, an image-forming layer, and an electrically conductive layer, said electrically conductive layer having been formed by applying a coating composition of a liquid medium containing:

a) a vanadium oxide gel, b) a film-forming binder, and c) a conductivity-increasing amount of a volatile aromatic compound comprising an aromatic ring substituted with at least one hydroxy group or a hydroxy substituted substituent group, and drying the coating.

19. An imaging element according to claim 18 in which the image forming layer comprises silver halide grains dispersed in gelatin.

20. A photographic imaging element comprising a polyester film support, at least one photographic image recording layer comprised of silver halide grains dispersed in a gelatin binder on one side of the support, an electrically conductive layer on the side of the support opposite to the image recording layer, and a transparent magnetic recording layer overlying the electrically conductive layer, said electrically conductive layer having been formed by applying a coating composition of a liquid medium containing:

a) a vanadium oxide gel, b) a film-forming binder, and c) a conductivity-increasing amount of a volatile aromatic compound comprising an aromatic ring substituted with at least one hydroxy group or a hydroxy substituted substituent group, and drying the coating.

* * * * *